(12) United States Patent
Chung et al.

(10) Patent No.: US 12,553,834 B2
(45) Date of Patent: Feb. 17, 2026

(54) SUBSTRATE INSPECTION METHOD (71) Applicant: Samsung Electronics Co., Ltd., Suwon-si (KR)

(72) Inventors: Kihong Chung, Suwon-si (KR); Kiwook Song, Suwon-si (KR); Seungryeol Oh, Suwon-si (KR); Chungsam Jun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 192 days.

(21) Appl. No.: 18/219,494

(22) Filed: Jul. 7, 2023

(65) Prior Publication Data
US 2024/0019380 A1 Jan. 18, 2024

(30) Foreign Application Priority Data

Jul. 18, 2022 (KR) .................. 10-2022-0088580

(51) Int. Cl.
G01N 21/95 (2006.01)
G01B 15/02 (2006.01)
G01N 21/21 (2006.01)
G01N 21/29 (2006.01)
G01N 21/88 (2006.01)
G01N 23/2251 (2018.01)
H01L 21/66 (2006.01)

(52) U.S. Cl.
CPC ......... *G01N 21/9501* (2013.01); *G01B 15/02* (2013.01); *G01N 21/211* (2013.01); *G01N 21/29* (2013.01); *G01N 21/8851* (2013.01); *G01N 23/2251* (2013.01); *G01B 2210/56* (2013.01); *G01N 2021/213* (2013.01); *G01N 2021/8864* (2013.01); *G01N 2223/6116* (2013.01); *H01L 22/12* (2013.01)

(58) Field of Classification Search
CPC .. G01N 21/9501; G01N 21/211; G01N 21/29; G01N 21/8851; G01N 23/2251; G01N 2021/213; G01N 2021/8864; G01N 2223/6116; G01N 21/956; G01N 21/8806; G01N 2021/8845; G01N 2021/8854; G01B 15/02; G01B 2210/56; H01L 22/12; H01L 22/20
See application file for complete search history.

(56) References Cited

U.S. PATENT DOCUMENTS

| | | | |
|---|---|---|---|
| 7,729,529 B2 | 6/2010 | Wu et al. | |
| 7,732,761 B2 | 6/2010 | Tanaka et al. | |
| 8,094,924 B2 | 1/2012 | Jau et al. | |
| 9,355,208 B2 | 5/2016 | Shifrin et al. | |
| 10,192,302 B2 | 1/2019 | Brauer et al. | |
| 10,359,706 B1 * | 7/2019 | Sriraman | G03F 7/70633 |
| 10,438,825 B2 | 10/2019 | Jain et al. | |

(Continued)

*Primary Examiner* — Thanh Luu
*Assistant Examiner* — Mai Thi Ngoc Tran
(74) *Attorney, Agent, or Firm* — Muir Patent Law, PLLC (57) ABSTRACT A substrate inspection method includes radiating light onto a substrate, extracting a spectrum representing an intensity of light according to a wavelength from a light reflected from the substrate, analyzing the extracted spectrum in units of each of an entire substrate, a shot, a chip, and a block, generating a spectrum distribution map indicating reflectivity for each wavelength band by using the analyzed spectrum, and extracting a weak point in the substrate based on the spectrum distribution map.

20 Claims, 10 Drawing Sheets (56) References Cited

U.S. PATENT DOCUMENTS

| | | |
|---|---|---|
| 10,713,771 B2 | 7/2020 | Marella et al. |
| 10,943,048 B2 | 3/2021 | Nojima et al. |
| 11,237,117 B2 | 2/2022 | Havener et al. |
| 2006/0047485 A1* | 3/2006 | Whitefield ............ G05B 17/02 702/194 |
| 2012/0131529 A1 | 5/2012 | Hayakawa et al. |
| 2017/0200658 A1* | 7/2017 | Yang ................ G01N 21/95607 |
| 2020/0311489 A1* | 10/2020 | Taylor ................... G06F 18/231 |
| 2020/0380655 A1* | 12/2020 | Chu ....................... G06F 18/231 |
| 2021/0028035 A1* | 1/2021 | Lee ...................... G01N 21/211 |

* cited by examiner

SUBSTRATE INSPECTION METHOD

CROSS-REFERENCE TO RELATED APPLICATION

This application is based on and claims priority under 35 U.S.C. § 119 to Korean Patent Application No. 10-2022-0088580, filed on Jul. 18, 2022, in the Korean Intellectual Property Office, the disclosure of which is incorporated by reference herein in its entirety.

BACKGROUND

Aspects of the inventive concept relate to a substrate inspection method, and more particularly, to a substrate inspection method of extracting weak points in units of an entire substrate, shot, chip, and block using a spectrum.

A semiconductor device is manufactured using a substrate, and through hundreds of manufacturing processes. Accordingly, after various semiconductor device manufacturing processes are performed on a substrate, it is important to quickly inspect or measure results of the manufacturing processes.

A semiconductor manufacturing process is highly integrated, and therefore, three-dimensional (3D) profile measurement technology with respect to semiconductor fine patterns or complex structures has been developed. Recently, in memory and logic products, a substrate is manufactured using fine process technology having a line width equal to or less than 20 nm, and technology for monitoring a high speed fine pattern process is used to improve substrate yield and quality.

SUMMARY

Aspects of the inventive concept provide a spectral microscopic inspection (SMI)-based substrate inspection method capable of precisely measuring and extracting weak points on a substrate at a high speed.

According to an aspect of the inventive concept, a substrate inspection method includes radiating light onto a substrate, extracting a spectrum representing an intensity of light according to a wavelength from a reflected light reflected from the substrate, analyzing the extracted spectrum in units of each of an entire substrate, a shot, a chip, and a block, generating a spectrum distribution map indicating reflectivity for each wavelength band by using the analyzed spectrum, and extracting a weak point in the substrate based on the spectrum distribution map.

According to another aspect of the inventive concept, a substrate inspection method includes radiating light onto a substrate, extracting a spectrum representing an intensity of light according to a wavelength from a reflected light reflected from the substrate, generating a spectrum distribution map by using the extracted spectrum in units of any one of, or more than one of: an entire substrate, a shot, a chip, and a block, extracting a weak point in the substrate based on the spectrum distribution map, and further inspecting the weak point.

According to another aspect of the inventive concept, a substrate inspection method includes obtaining a spectrum of a substrate by using an oblique optical system and a vertical optical system, analyzing the spectrum in a unit of each of an entire substrate, a shot, a chip, and a block, extracting a weak point in the substrate using the analyzed spectrum, performing a further, targeted inspection on the weak point of the substrate based on the extracted weak point.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Hereinafter, embodiments of the inventive concept will be described in detail with reference to the accompanying drawings. The same reference numerals are used for the same components in the drawings, and redundant descriptions thereof are omitted.

Figure 1:
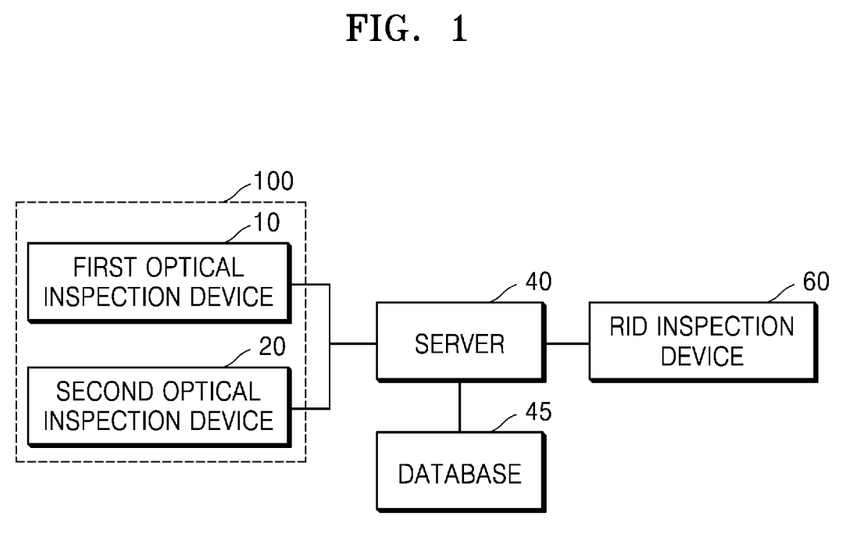
FIG. 1 is a block diagram illustrating a substrate inspection system according to an embodiment.

FIG. 1 is a block diagram illustrating a substrate inspection system according to an embodiment.

Referring to FIG. 1, a substrate inspection system 1 may include a substrate inspection device 100, a server 40, a database 45, and a review inspection device (RID) inspection device 60. The substrate inspection device 100 may include a first optical inspection device 10 and a second optical inspection device 20. The first optical inspection device 10 may include a vertical optical system Vop, and the second optical inspection device 20 may include an oblique optical system Top.

The substrate inspection device 100 may be a spectral microscopic inspection (SMI)-based device. The substrate inspection device 100 is described in detail with reference to FIG. 2. The substrate inspection device 100 may transmit spectrum data obtained by inspecting a substrate to the server 40.

The server 40 may receive the spectrum data from the substrate inspection device 100 and store the spectrum data in the database 45. The database 45 may be stored on the server 40 or may be stored elsewhere and be accessible from the server 40. The server 40 may include various integrated circuit components, software elements, memory elements, processing elements, logic elements, lookup tables, etc. that are capable of performing various functions under control by one or more microprocessors or other control devices. The server 40 may be implemented in the form of a computer (e.g., personal computer, laptop, other computing device), which may include I/O devices, a display screen, networking components, and the other hardware, firmware, and software components described herein.

Software elements of the server 40 may be implemented in any programming or scripting language, for example, C, C++, C #, Java, JavaScript, JavaScript Object Notation (JSON), VBScript, Macromedia Cold Fusion, COBOL, active server pages, Perl, assembly, PHP, awk, Python, Visual Basic, SQL stored procedures, PL/SQL, any Unix shell script, and/or any extensible markup language (XML), and various algorithms of the server 40 may be implemented in any combinations of data structures, objects, processes, routines, or other programming elements.

The server 40 may perform various calculations using the spectrum data. For example, the server 40 may perform a minimum covariance determinant (MCD) algorithm using a Python program. The server 40 may extract a weak point on the substrate using the spectrum data. The extracting of the weak point may determine the weak point to be a likely weak point, and thus may predict an actual weak point, or defective point, on the substrate.

The RID inspection device 60 may include an inspection device using an electron beam (E-BEAM). The RID inspection device 60 may include a scanning electron microscope (SEM), a transmission electron microscope (TEM), and/or an electron beam inspection device. The RID inspection device 60 may receive the weak point of the substrate from the server 40 and perform a close inspection on the weak point using the E-BEAM.

Figure 2:
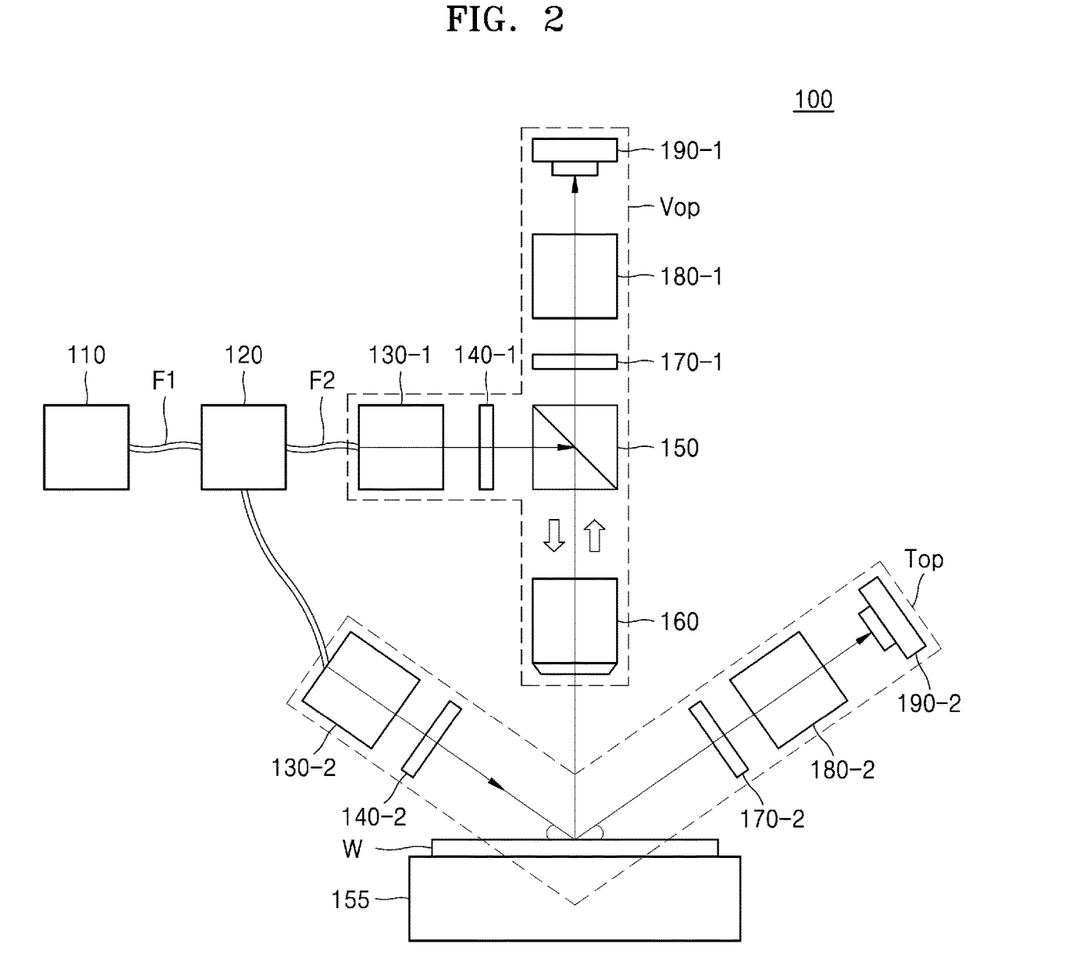
FIG. 2 schematically illustrates a configuration of an optical inspection device used in a substrate inspection method according to an embodiment.

FIG. 2 is a structural diagram schematically illustrating an SMI-based inspection device according to an embodiment.

Referring to FIG. 2, the SMI-based inspection device 100 of the present embodiment may be an imaging ellipsometry (IE)-based inspection device. Here, IE may include spectroscopic imaging ellipsometry (SIE). Ellipsometry, which is a method of measuring the optical microstructure of a single or multilayer thin film on a sample by analyzing a polarization state that changes when incident light is reflected from the sample, uses the reflection of light, and thus, a specific measurement condition, such as vacuum, may not be required.

Spectroscopic ellipsometry with the added spectral function measures and analyzes an object to be inspected based on a large amount of information measured at various wavelengths, thereby improving the reliability of analysis. A method of measuring and analyzing an object to be inspected by obtaining a two-dimensional (2D) image through a detector such as a CCD camera based on such ellipsometry or spectroscopic ellipsometry is referred to as IE or SIE.

On the other hand, in the SMI-based inspection device 100 of the present embodiment, SMI is an abbreviation of spectral microscopic inspection, and is a combination word of spectral related to spectroscopy, microscopic related to images, and inspection related to inspection in relation to the SIE described above. Hereinafter, the 'SMI-based inspection device' is simply referred to as an 'inspection device'.

The inspection device 100 of the present embodiment may include the vertical optical system Vop, the oblique optical system Top, and a stage 155. In FIG. 2, the vertical optical system Vop and the oblique optical system Top are expressed and distinguished by dashed lines, and may commonly include a light source 110 and a monochromator 120. Accordingly, the light source 110 and the monochromator 120 are not distinguished by dashed lines.

The vertical optical system Vop may include the light source 110, the monochromator 120, a first collimator 130-1, a first polarizer 140-1, a beam splitter 150, an objective lens 160, a first analyzer 170-1, a first imaging lens 180-1, and a first detector 190-1.

In an optical inspection device, an optical system is divided into an illumination optical system and an imaging optical system. In general, the illumination optical system may mean an optical system on a path from the light source 110 to a substrate W, and the imaging optical system may mean an optical system on a path from the substrate W to a detector.

For example, in the vertical optical system Vop, the illumination optical system may include the first collimator 130-1, the first polarizer 140-1, and the beam splitter 150, and the imaging optical system may include the objective lens 160, the first analyzer 170-1, and the first imaging lens 180-1. Furthermore, in the oblique optical system Top, the illumination optical system may include a second collimator 130-2 and a second polarizer 140-2, and the imaging optical system may include a second analyzer 170-2, and a second imaging lens 180-2.

The light source 110 may be a broadband light source or a multi-wavelength light source that generates and outputs broadband light. The broadband light of the light source 110 may be polychromatic light including light of a plurality of wavelength bands. For example, in the inspection device 100 of the present embodiment, the light source 110 may generate and output light in a wavelength range of about 150 nm to about 2100 nm. The wavelength range of the light generated by the light source 110 is not limited to the above range. The light source 110 may be a halogen lamp light source or an LED light source that produces continuous spectrum light. However, the type of the light source 110 is not limited thereto. In the inspection device 100 of the present embodiment, the light source 110 is implemented as a broadband light source, and thus, the configuration of various spectrums is possible.

The monochromator 120 may convert the broadband light of the light source 110 into monochromatic light and output the monochromatic light. Here, the monochromatic light may mean light with a very short wavelength width (e.g., very short wavelength band). For example, the monochromatic light may be light with a wavelength width of about several nm (e.g., 1 nm to less than about 10 nm). The monochromator 120 may output a plurality of pieces of monochromatic light while sweeping with a wavelength width set in a certain wavelength range. The monochromator 120 may include a grid or a prism capable of splitting incident light for each wavelength. For example, within a particular range of wavelengths, the monochromator may output a plurality of very narrow bandwidth bands of light (each bandwidth as small as 1 nm), each band centered around at a different wavelength within a the range.

The first collimator 130-1 may output the monochromatic light incident from the monochromator 120 as parallel light. Light from the light source 110 to the monochromator 120 may be transmitted through a first optical fiber F1, and light from the monochromator 120 to the first collimator 130-1 may be transmitted through a second optical fiber F2. The transfer of light is not limited to optical fibers.

The first polarizer 140-1 may polarize and output the light from the first collimator 130-1. Polarization may be, for example, at least one of linear polarization, circular polarization, or elliptical polarization. Here, the linear polarization may mean making only a p-polarization component (or a horizontal component) or an s-polarization component (or a vertical component) of incident light transmitted through and converting the incident light into linearly polarized light. Meanwhile, circular polarization or elliptical polarization may mean converting linearly polarized light into circularly polarized light or elliptically polarized light by giving a phase difference to linearly polarized light, or, conversely, converting circularly polarized light or elliptically polarized light into vertically polarized light. Accordingly, a polarizer that performs circular polarization or elliptical polarization is also called a phase retarder.

The beam splitter 150 may make the light from the first polarizer 140-1 be incident on the substrate W, and may emit light reflected from the substrate W toward the first detector 190-1. For example, the beam splitter 150 may transmit or reflect the light from the first polarizer 140-1 to be incident on the substrate W, and reflect or transmit the light from the substrate W and emit the light in a direction of the first detector 190-1.

The objective lens 160 may condense the light from the beam splitter 150 to the substrate W to be incident thereon. Also, the objective lens 160 may make the light reflected from the substrate W be incident on the beam splitter 150.

The first analyzer 170-1 may be disposed at the rear end of the beam splitter 150, and may selectively transmit reflected light that is reflected from the substrate W and having a changed polarization direction. For example, the first analyzer 170-1 may transmit therethrough only a specific polarization component in the incident light and block the remaining components. According to an embodiment, the first analyzer 170-1 may be disposed at the rear end (e.g., back end) of the first imaging lens 180-1. Here, the front end and the rear end may mean relative positions with respect to the corresponding components with respect to a direction in which light travels. Upon describing a lens as an example, when light transmits through the lens before a component, the lens may be seen as being disposed at the front end of the component, and conversely, when light transmits through the component first and then transmits through the lens, the lens may be seen as being disposed at the rear end of the component.

The first imaging lens 180-1 may include at least one lens for imaging. For example, the first imaging lens 180-1 may include an imaging tube lens. The first imaging lens 180-1 may allow the light reflected from the substrate W to be incident on the first detector 190-1 so that the substrate W may be imaged on the first detector 190-1. The entire substrate W is not imaged, but only a part of the substrate W corresponding to a field of view (FOV) may be imaged on the first detector 190-1 through the first imaging lens 180-1.

The first detector 190-1 may generate a 2D image of the substrate W. For example, the first detector 190-1 may receive the light reflected from the substrate W through the first imaging lens 180-1 so that the substrate W may be imaged on an imaging plane. The 2D image of the substrate W is not the entire substrate W, but is a 2D image corresponding to the FOV of the first detector 190-1 as described above. The first detector 190-1 may be, for example, a charge coupled device (CCD) camera. However, the first detector 190-1 is not limited to a CCD camera.

The first detector 190-1 may generate a plurality of 2D images of the substrate W respectively in response to a plurality of wavelength bands. More specifically, in the inspection device 100 of the present embodiment, the light source 110 may generate and output broadband light, and the monochromator 120 may divide the broadband light into a plurality of wavelength bands and sequentially input the plurality of wavelength bands to the substrate W. Accordingly, the first detector 190-1 may generate the plurality of 2D images of the substrate W respectively corresponding to the wavelength bands.

In the inspection device 100 of the present embodiment, the first detector 190-1 may be a high-resolution detector. For example, the first detector 190-1 may have a pixel size equal to or less than 500 nm and an FOV equal to or greater than 400*400 $\mu m^2$. The pixel size and FOV of the first detector 190-1 are not limited to the aforementioned numerical values. The first detector 190-1 may have a very high resolution due to the fine pixel size. For example, the first detector 190-1 may have a resolution equal to or less than 500 nm.

In the inspection device 100 of the present embodiment, the first detector 190-1 is implemented with a high resolution based on the vertical optical system Vop, thereby contributing to the miniaturization and densification of an inspection region in the substrate W, and accordingly, simultaneous measurement and/or measurement throughput with respect to the substrate W may be improved. In addition, the first detector 190-1 may be regarded as having a very small or almost non-existent spot size, and thus, signal distortion caused by mismatch between the spot size and the size of a measurement region and a consequent reduction in measurement consistency may be avoided.

Meanwhile, the oblique optical system Top may include the light source 110, the monochromator 120, a second collimator 130-2, a second polarizer 140-2, a second analyzer 170-2, a second imaging lens 180-2, and a second detector 190-2.

As described above, the light source 110 and the monochromator 120 are shared by the vertical optical system Vop and the oblique optical system Top, and their functions may also be substantially the same in the vertical optical system Vop and the oblique optical system Top. Therefore, detailed descriptions thereof are omitted.

The second collimator 130-2, the second polarizer 140-2, and the second analyzer 170-2 may be different from the first collimator 130-1 and the first polarizer 140-1, and the first analyzer 170-1, respectively, only in an arrangement position, and may perform substantially the same function as the first collimator 130-1 and the first polarizer 140-1, and the first analyzer 170-1, respectively. For example, as shown in FIG. 2, the second collimator 130-2 and the second polarizer 140-2 may be disposed on a path through which the monochromatic light output from the monochromator 120 is obliquely incident on the substrate W. The second analyzer 170-2 may be disposed on a path through which light reflected from the substrate W is emitted obliquely.

Here, oblique may be defined with respect to an upper surface of the substrate W or may be defined with respect to a normal line of the upper surface. The second collimator 130-2 may output the monochromatic light incident from the monochromator 120 as parallel light, the second polarizer 140-2 may polarize and output the light from the second collimator 130-2, and the second analyzer 170-2 may selectively transmit light reflected from the substrate W and having a changed polarization direction.

The second imaging lens 180-2 may include at least one lens for imaging. For example, the second imaging lens 180-2 may include an imaging tube lens. The second imaging lens 180-2 may allow the substrate W to be imaged on the second detector 190-2. In one embodiment, the entire substrate W is not imaged, but only a part of the substrate W corresponding to an FOV is imaged on the second detector 190-2 through the second imaging lens 180-2.

The second detector 190-2 may generate a 2D image of the substrate W. For example, the second detector 190-2 may receive light reflected from the substrate W through the second imaging lens 180-2 so that the substrate W may be imaged on an imaging plane. Like the first detector 190-1, the second detector 190-2 may generate a plurality of 2D images of the substrate W respectively in response to a plurality of wavelength bands. The second detector 190-2 may also be a CCD camera. However, the second detector 190-2 is not limited to a CCD camera.

In the inspection device 100 of the present embodiment, the second detector 190-2 may be a high-resolution and large-area detector. For example, the second detector 190-2 may have a pixel size equal to or less than 10 μm and an FOV of about $9*9$ mm$^2$. Accordingly, the second detector 190-2 may measure a part of the substrate W with a high resolution and corresponding to a wide FOV through one imaging. For example, the second detector 190-2 may obtain a 2D image of the substrate W with a resolution of about 5 μm to about 10 μm and an FOV of $8*5$ mm$^2$. Accordingly, the second detector 190-2 may measure the substrate W at a high speed in a plane unit based on the wide FOV.

For reference, when the first detector 190-1 is roughly compared with the second detector 190-2 in terms of resolution and FOV, the resolution of the first detector 190-1 may be greater than 10 times the resolution of the second detector 190-2. Also, the FOV of the second detector 190-2 may be greater than 100 times the FOV of the first detector 190-1. Relative sizes of the resolution and FOV between the first detector 190-1 and the second detector 190-2 are not limited to the above numerical values.

In the inspection device 100 of this embodiment, the second detector 190-2 is implemented to have the large-area FOV based on the oblique optical system Top, and therefore, measurement regions included in the part corresponding to the FOV of the substrate W may be simultaneously measured. Accordingly, the measurement speed with respect to the measurement regions of the substrate W may be significantly improved.

The substrate W may be disposed on the stage 155. The stage 155 may move the substrate W through linear movement in the x-direction, y-direction, and z-direction. Accordingly, the stage 155 is also referred to as an x-y-z stage. Also, according to an embodiment, the stage 155 may move the substrate W through linear and/or rotational movement.

Here, the substrate W may be one of various elements to be inspected, such as a wafer, a semiconductor package, a semiconductor chip, a display panel, etc. For example, in the inspection device 100 of the present embodiment, the substrate W may be a wafer including a plurality of semiconductor chips. In addition, a plurality of measurement regions for controlling a lithography process may be formed on the wafer, which is the substrate W. For example, the plurality of measurement regions may include an overlay key, a focus key, a dose key, a CD key, etc.

Although not shown, each of the vertical optical system Vop and the oblique optical system Top may further include optical elements in addition to the aforementioned components. For example, the vertical optical system Vop may further include a shutter, a neutral density (ND) filter, at least one reflection mirror, a focus lens, etc. in the illumination optical system. In addition, the oblique optical system Top may include a shutter and an ND filter in the illumination optical system, and may include at least one folding mirror in the illumination optical system.

The inspection device 100 of the present embodiment may include the vertical optical system Vop of a high-resolution SMI mode and the oblique optical system Top of a large-area SMI mode. Accordingly, the inspection device 100 of the present embodiment may contribute to miniaturization and densification of the measurement regions in the substrate W based on the vertical optical system Vop, and also, may improve simultaneous measurement and/or measurement throughput with respect to the measurement regions.

The inspection device 100 according to the present embodiment may measure the substrate W at the high-resolution with the large-area FOV based on the oblique optical system Top, thereby measuring the substrate W at a high speed in a plane unit. In addition, the inspection device 100 according to the present embodiment may measure measurement regions in a scribe lane, e.g., an overlay key as well as an overlay between patterns in cells, thereby obtaining an overlay locality in a shot according to a process variation and also securing accurate data by removing noise due to an averaging effect.

The inspection device 100 of the present embodiment may minimize the spot size based on the high resolution, and accordingly, may reduce or remove signal distortion caused by mismatch between the spot size and the size of the measurement region, and a consequent reduction of measurement consistency.

The inspection device 100 according to the present embodiment may measure and inspect the measurement regions formed on the substrate W at a high resolution precisely and with a large area at a high speed through the vertical optical system Vop of the high-resolution SMI mode and the oblique optical system Top of the large-area SMI mode, thereby detecting an error in a semiconductor process, for example, a lithography process. In addition, the inspection device 100 of the present embodiment may provide, as feedback, data of the measurement regions obtained through measurement and utilize the data as reference data in the lithography process or use for calibration of the reference data. In addition, the inspection device 100 of the present embodiment may efficiently control the lithography process by using the reference data obtained above. However, the inspection device 100 of the present embodiment is not limited to the lithography process and may be utilized in various processes required for manufacturing a semiconductor device.

Figure 3A:
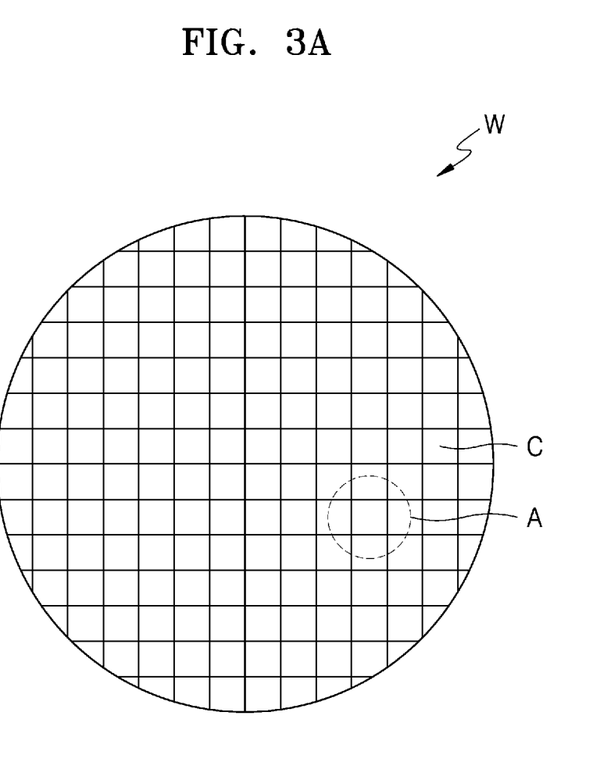
FIGS. 3A to 3B are diagrams illustrating measurement regions on a substrate by the optical inspection device of FIG. 2 according to an embodiment.
Figure 3B:
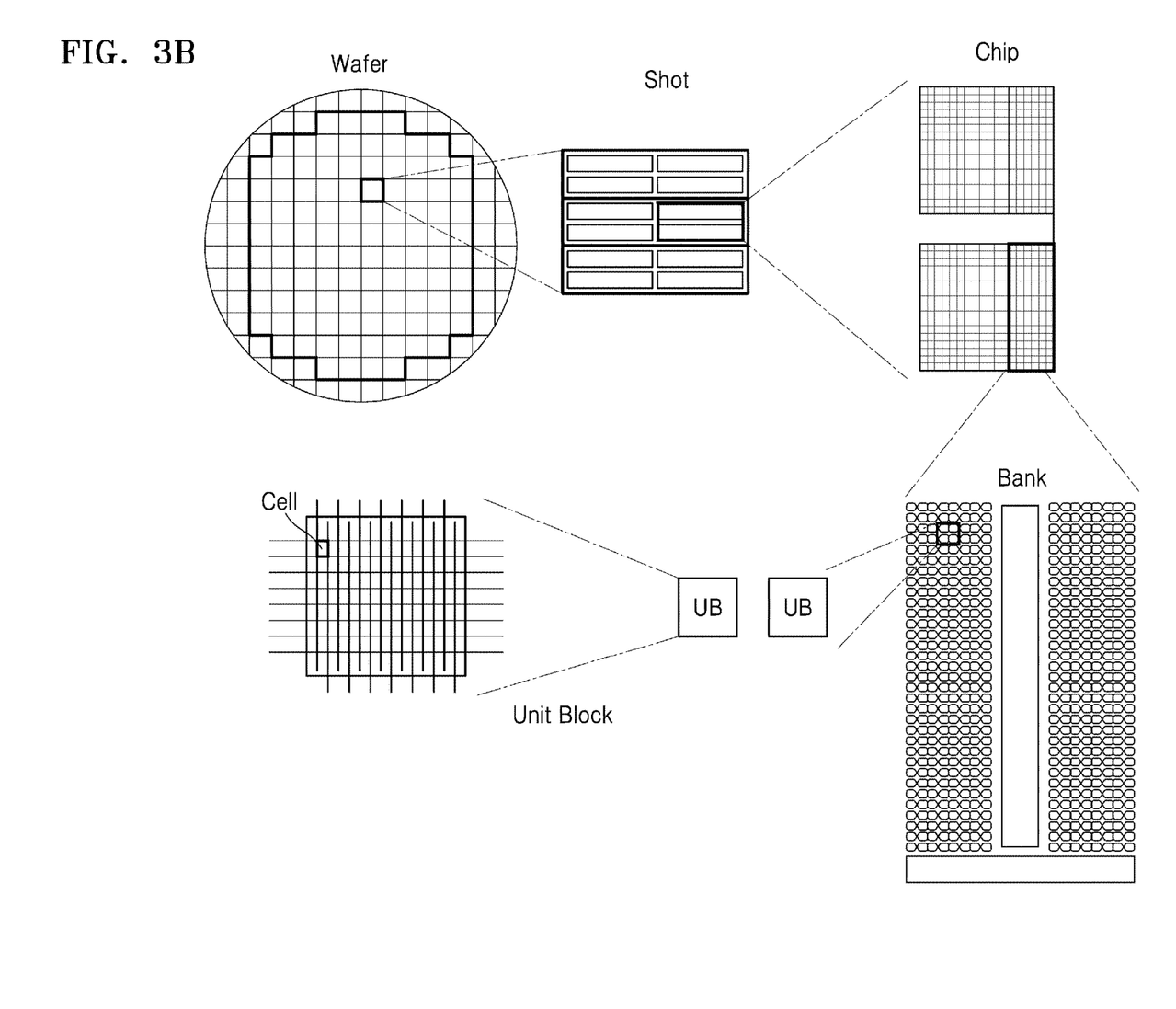

FIGS. 3A to 3B are diagrams illustrating inspection regions on a substrate by the optical inspection device of FIG. 2 according to an embodiment.

FIG. 3A shows the substrate W as an example of an object to be inspected of the substrate inspection device 100 of FIG. 2. Referring to FIG. 3A, the substrate W may be a wafer including a plurality of chips C, and an inspection region A to be inspected may include at least one chip C. Alternatively, the inspection region may be a region corresponding to the single chip C. The substrate W may be referred to as a wafer.

FIG. 3B is a diagram illustrating the inspection region A on the substrate W in units of wafer, shot, chip, bank, unit block, and cell. Referring to FIG. 3B, the wafer is shown in the top leftmost, and a plurality of shots divided by a straight line are displayed inside the wafer. Here, the shot may refer to a process of transferring patterns on a mask onto a wafer through one exposure in a lithography process or a region on the wafer corresponding to the process.

A shot is shown enlarged in the second from the top left, and may include a plurality of chips. For example, 18 chips may be included in one shot. However, the number of chips included in a shot is not limited to 18. For example, depending on the type of chip, a shot may include one chip or various numbers of chips. A chip may refer to an integrated circuit separated from other chips by scribe lanes, and may be, for example a memory chip or a logic chip.

A bank is shown enlarged in the second from the bottom right. Here, the bank may be an aggregate in which a plurality of unit blocks are gathered. A scribe lane may also exist between banks. For reference, a scribe lane usually means a region for sawing, but may here mean a region within a bank other than a bank part in which cells are disposed. A unit block is shown enlarged at the bottom leftmost, and may here be an aggregate in which cells are gathered. A cell refers to a particular component such as a memory cell, an image sensor cell, or the like. Thus, units of a wafer, a shot, a chip, a bank, a unit block and a cell may refer to progressively smaller units of the wafer, wherein a plurality of smaller units combine together to form a next larger unit.

Here, the substrate inspection device 100 may perform substrate inspection by covering the entire substrate W as the entire wafer (e.g., substrate), shot, chip, and block units. For example, the vertical optical system Vop of the substrate inspection device 100 may obtain a spectrum of a block unit in a high-resolution SMI mode. Also, the oblique optical system Top of the substrate inspection device 100 may obtain the spectrum of the substrate W in any one of the entire wafer, shot, and chip units.

The substrate inspection device 100 may analyze the spectrum and extract weak points with reference to a unit of the entire wafer, a shot, a chip, and a unit block. The substrate inspection device 100 may quickly inspect the weak point of the substrate W, by using the vertical optical system Vop and the oblique optical system Top. A weak point may correspond, for example, to an abnormality where a repeated pattern does not match with other repeated patterns on the substrate, or may refer to an abnormality where the analyzed spectrum does not match with an expected spectrum based on pre-determined analyses and expectations, for example. Through this, the substrate inspection device 100 may perform a close inspection of the substrate W based on the weak point, thereby reducing defects of the substrate W. The substrate inspection device 100 may improve the yield of a semiconductor device, by preventing the defects of the substrate W.

Figure 4:
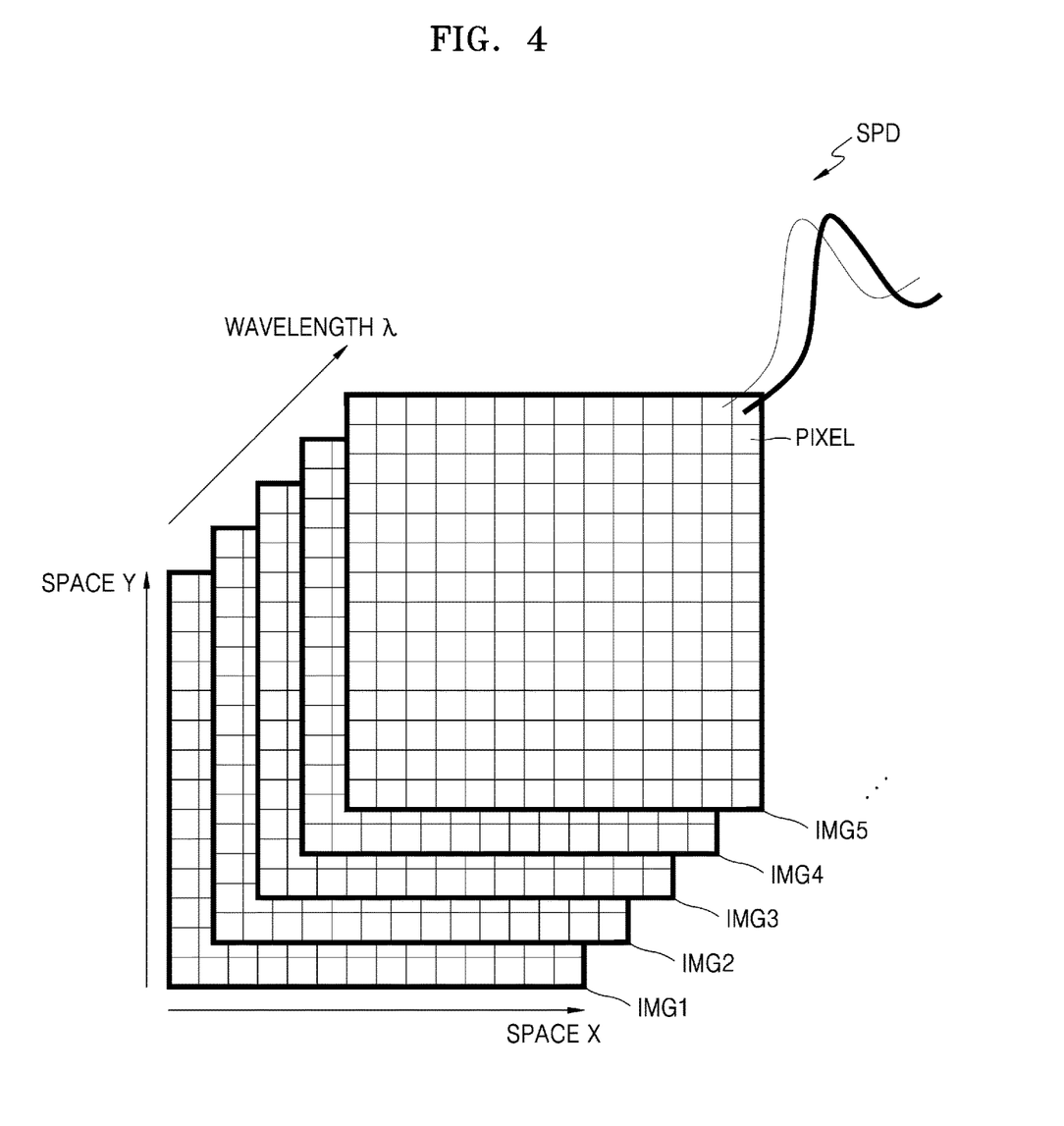
FIG. 4 is a conceptual diagram illustrating an image of a measurement region for each wavelength and spectrum data of each pixel according to an embodiment.

FIG. 4 is a conceptual diagram illustrating an image of a measurement region for each wavelength and spectrum data of each pixel according to an embodiment.

Referring to FIG. 4, the substrate inspection device 100 may obtain a plurality of images of the substrate W corresponding to each of a plurality of respective wavelengths. In some embodiments, the intensity of light may be extracted for each wavelength by using spectrum data SPD. Here, the spectrum data SPD may include spatial coordinates, for example, space X and space Y, and a plurality of images IMG1, IMG2, IMG3, IMG4, and IMG5, each image corresponding to a respective wavelength λ as shown in FIG. 4. Only five images IMG1, IMG2, IMG3, IMG4, and IMG5 for five respective wavelengths are illustrated in FIG. 4, but the inventive concept is not limited thereto. Each image may have different intensities of light at different locations.

Figure 5:
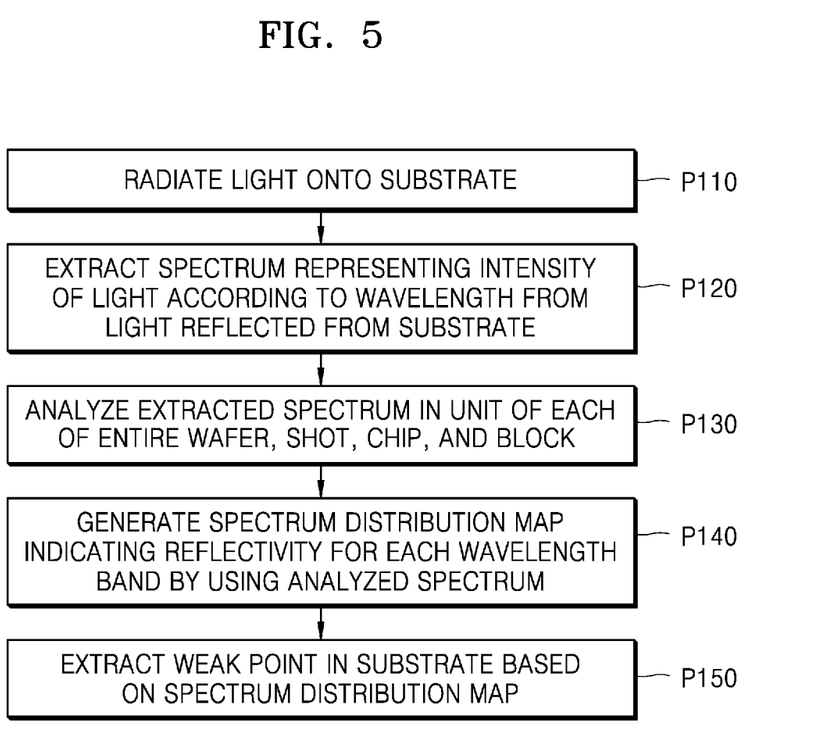
FIG. 5 is a flowchart specifically illustrating a substrate inspection method according to an embodiment.

FIG. 5 is a flowchart specifically illustrating a substrate inspection method and manufacturing method according to an embodiment. The substrate inspection method is described with reference to the substrate inspection device 100 of FIG. 2.

Referring to FIG. 5, in the substrate inspection method according to an embodiment, first, light may be radiated to the substrate W (P110). In the substrate inspection method according to an embodiment, a substrate inspection may be performed by radiating the light to the substrate W whenever a manufacturing process is completed. Specifically, after a prior manufacturing process is performed on the substrate W, a surface inspection may be performed on the substrate W on which the prior manufacturing process has been performed. A chip region may be formed on the substrate W on which the prior manufacturing process has been performed, but the inventive concept is not limited thereto. The prior manufacturing process may be any process used for manufacturing a semiconductor device, such as a deposition process, a pattern forming process, an etching process, a cleaning process, etc. For example, after a substrate is placed on a wafer, a plurality of processes, such as deposition, patterning, etching, cleaning, etc., may be performed, with an inspection being performed after each of one or more of the processes. After the processes and inspections are completed, additional steps may be performed, such as singulating a number of chips from a wafer, mounting the chips on a package substrate, and encapsulating the chips to form a package. Other processes can be implemented to result in a semiconductor device as a finished product (e.g., which semiconductor device may be a semiconductor chip, a semiconductor package, or a package-on-package device).

Here, the substrate inspection method may include an SMI-based inspection. The substrate inspection method may be performed by the inspection device 100 in both a high-resolution SMI mode and a large-area SMI mode. Here, the high-resolution SMI mode may correspond to the vertical optical system Vop, and the first detector 190-1 of the vertical optical system Vop may have a pixel size equal to or less than 500 nm and may cover an FOV equal to or greater than 400*400 μm². In addition, the large-area SMI mode may correspond to the oblique optical system Top, and the second detector 190-2 of the oblique optical system Top may have a pixel size equal to or less than 10 μm and may cover an FOV of about 9*9 mm². The FOV covered by the vertical optical system Vop may be smaller than the FOV covered by the oblique optical system Top.

After the light is radiated, the substrate inspection device 100 may be used to extract a spectrum indicating the intensity of light according to the wavelength from light reflected from the substrate W (P120). In some embodiments, a method of extracting the spectrum may mean obtaining a 2D image for each wavelength by using the substrate inspection device 100. In some embodiments, the method of extracting the spectrum may be extracting the spectrum by using at least one of a distance between spectra, an average reflectivity of the spectrum for each wavelength band, or Fourier transform information. The distance between the spectra may be a difference between two adjacent wavelengths, each of the two adjacent wavelengths including the intensity of light.

In some embodiments, the method of extracting the spectrum may mean extracting the spectrum of a plurality of wavelength bands for each of a short wavelength range, a medium wavelength range, and a long wavelength range. Here, the short wavelength range may be wavelengths in the range of about 380 nm to about 500 nm. The medium wavelength range may be wavelengths in the range of about 500 nm to about 600 nm. The long wavelength range may be wavelengths in the range of about 600 nm to about 780 nm.

After the spectrum is extracted, the extracted spectrum may be analyzed in unit areas of the entire substrate W, shots, chips, and blocks (P130). A unit area refers to a particular area for which a spectrum is extracted or is analyzed, and can refer to a different sized unit, such as the entire substrate W, a shot, a chip, and a block. In some embodiments, a method of analyzing the extracted spectrum in the entire substrate W unit may mean obtaining an average value of the extracted spectrum for each shot unit. In some embodiments, the method of analyzing the extracted spectrum for each shot may mean obtaining an average value of the extracted spectrum for each chip. In some embodiments, the method of analyzing the extracted spectrum in the block unit may mean obtaining an average value of the extracted spectrum in a plurality of cell units.

After the spectrum is analyzed, a spectrum distribution map indicating reflectivity for each wavelength band may be generated using the analyzed spectrum (P140). The spectrum distribution map may be a graph indicating the number of counts with respect to the intensity of light for each wavelength. In addition, the spectrum distribution may represent a Gaussian distribution. As an example of generating a spectrum distribution map, for each unit area, a spectrum indicating the intensity of light according to the wavelength from light reflected from that unit area may be determined.

After the spectrum distribution map is generated, a weak point in the substrate W may be extracted based on the spectrum distribution map (P150).

Figure 6:
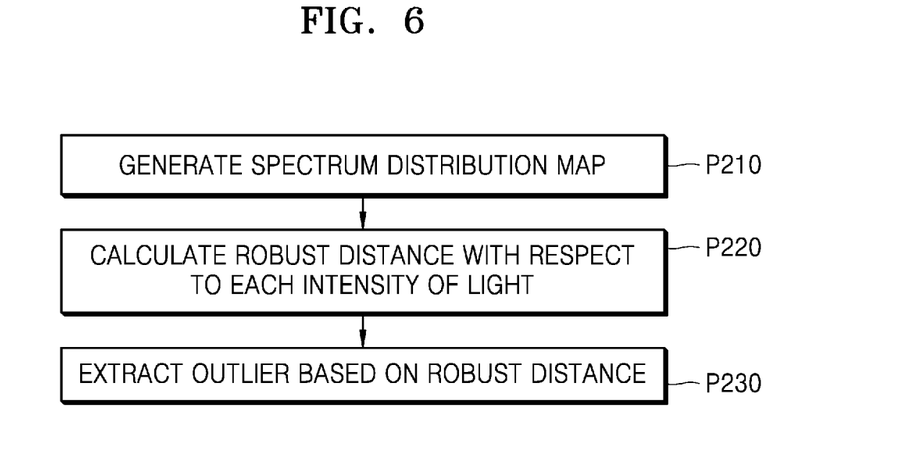
FIG. 6 is a flowchart illustrating a method of extracting an outlier, according to an embodiment.

FIG. 6 is a flowchart illustrating a method of extracting an outlier, according to an embodiment. Here, a method of extracting a weak point may include extracting the outlier from a spectrum distribution map.

Referring to FIG. 6, specifically, after the spectrum distribution map is generated (P210), in a substrate inspection method, a robust distance may be calculated for each intensity of light (P220). The robust distance may be calculated using an MCD method. The robust distance may mean a distance considering a form of the Gaussian distribution in multivariate data.

After the robust distance is calculated, the outlier may be extracted based on the robust distance (P230). The method of extracting the outlier may be based on a method of selecting the robust distance as the outlier when the robust distance is equal to or greater than a preset threshold value. The outlier may mean an abnormal point that deviates from a normal distribution in the spectrum distribution map. In some embodiments, the abnormal point may mean a value in which intensity of light according to wavelength is very small or large compared to a standard value. The outlier may refer to a particular location on wafer of a weak point, which has the above characteristics regarding intensity.

In some embodiments, the outlier may be extracted within a range of about 3 percent to about 17 percent with respect to the entire spectrum distribution map (e.g., when the value of the outlier deviates more than an amount selected from between 3 and 17 percent from the average value for the entire spectrum distribution map). In embodiments, the outlier may be extracted within a range of about 5 percent to about 15 percent with respect to the entire spectrum distribution map (e.g., when the value of the outlier deviates more than an amount selected from between 5 and 15 percent from the average value for the entire spectrum distribution map). In some embodiments, the outlier may be extracted within a range of about 7 percent to about 10 percent with respect to the entire spectrum distribution map (e.g., when the value of the outlier deviates more than an amount selected from between 7 and 10 percent from the average value for the entire spectrum distribution map). In embodiments, an ideal outlier extraction threshold may be 10 percent, but is not limited thereto. The above-described, as well as below-described extraction methods may be implemented by a computer, such as server 40 described in FIG. 1.

Figure 7:
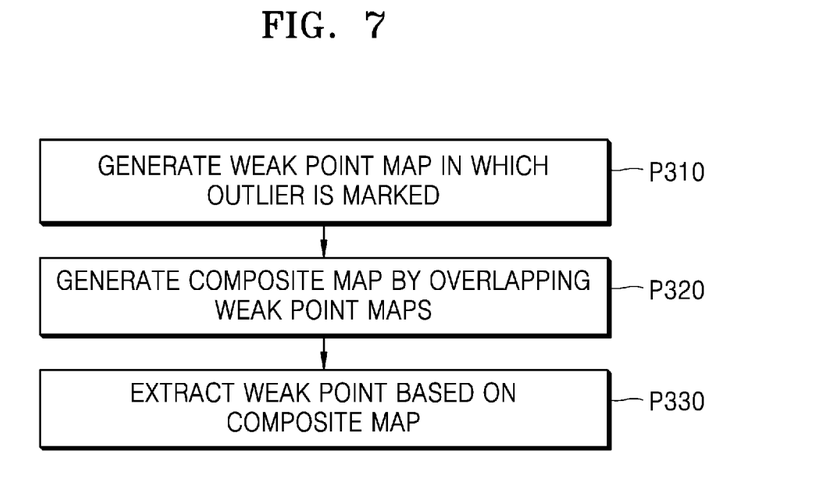
FIG. 7 is a flowchart schematically illustrating a method of extracting a weak point according to an embodiment.

FIG. 7 is a flowchart illustrating a method of extracting an outlier, according to an embodiment.

Referring to FIG. 7, in a substrate inspection method, a weak point map in which the outlier is marked may be generated (P310). The outlier indicates an abnormal point where the intensity of light according to a wavelength deviates from a normal distribution, and may include a weak point in a substrate. The weak point map may be generated in a unit size of any one of the entire wafer, shot, chip, and block. In the weak point map, each outlier may be marked at a point corresponding to an inside of any one of the entire wafer, shot, chip, or block.

After the weak point map is generated, a composite map may be generated by overlapping weak point maps (P320). The composite map may be generated in a unit size of any one of the entire wafer, shot, chip, and block. On the composite map, a part where outliers marked on the weak point map overlap may be marked in dark or red. For example, an overlapping part of 30 weak points may be darker or marked in red compared to an overlapping part of 10 weak points. For example, each weak point map may refer to a map of the entire substrate or a portion of the substrate generated using a particular unit size. So a first weak point map may be generated using a unit size of the entire wafer, where weak points are marked with respect to the entire substrate. A second weak point map may be generated using a unit size of a shot, where the plurality of shots cover the entire surface of the wafer or a portion of the entire surface of the wafer and the weak points are marked with respect to the shots. A third weak point map may be generated using a unit size of a chip, where the plurality of chips cover the entire surface of the wafer or a portion of the entire surface of the wafer and the weak points are marked with respect to the chips, etc. The description of weak points being marked refers to an automated process where weak points are designated as weak points by the automated process. This designation may be used in further analyses and/or may be included or indicated in a map or display showing weak points.

After the composite map is generated, a weak point may be extracted based on the composite map (P330). The weak point may include a part where abnormal points (e.g., outliers) overlap. In some embodiments, a point where 30 percent or more of an overlapping number of the entire weak point maps overlaps may be extracted as the weak point (e.g., where a particular point is an outlier in 30 percent or more of the weak point maps). In some embodiments, a point where 40 percent or more of an overlapping number of the entire weak point maps overlaps may be extracted as the weak point. In some embodiments, a point where 50 percent or more of an overlapping number of the entire weak point maps overlaps may be extracted as the weak point.

Next, a close inspection (e.g., a further inspection targeted at the weak point) of the substrate may be performed based on the weak point. Here, the close inspection may be an inspection searching for an actual defect on the substrate with respect to the part marked with the weak point by using an electron beam (E-Beam) device or a critical dimension scanning electron microscope (CD-SEM).

It may be confirmed that the weak point obtained by the substrate inspection method is identical to the actual defect of the substrate. According to the inventive concept, the close inspection (e.g., a substrate inspection by using the E-Beam device) may be performed on the substrate after the weak point of the substrate is obtained, and thus, the detection power of the defect of the substrate may be improved. In addition, the close inspection may be performed after a weak point that is highly likely to have a defect is previously obtained, and thus, a substrate inspection time may be reduced. The defect of the substrate may be detected and compensated for through the substrate inspection, and thus, the yield of a semiconductor device manufacturing process may be improved. For example, defective portions of the substate may be addressed, either by being later discarded or by being corrected by further manufacturing steps, and subsequently, non-defective portions of the substrate can be included in a completed product. In this manner, some defects can be avoided, and/or and the speed for determining defective versus non-defective portions can be increased, thereby improving and speeding up the overall yield of semiconductor devices formed in the manufacturing process.

Figure 8A:
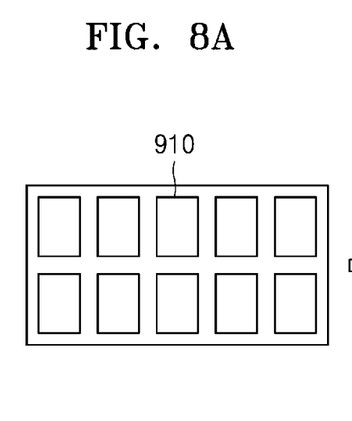
FIGS. 8A to 8C are illustrations of photographs schematically illustrating a method of selecting an inspection target based on a weak point by a substrate inspection method.
Figure 8B:
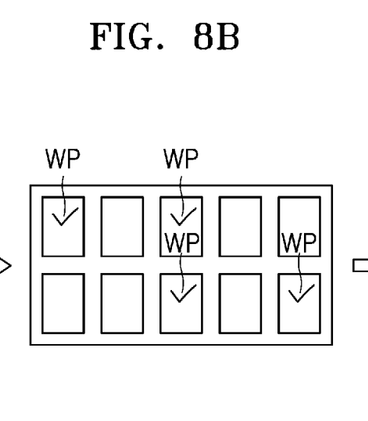
Figure 8C:
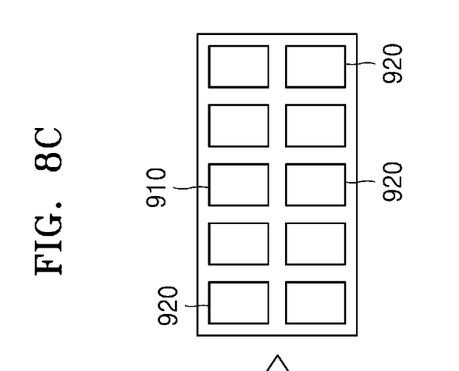
Figure 9:
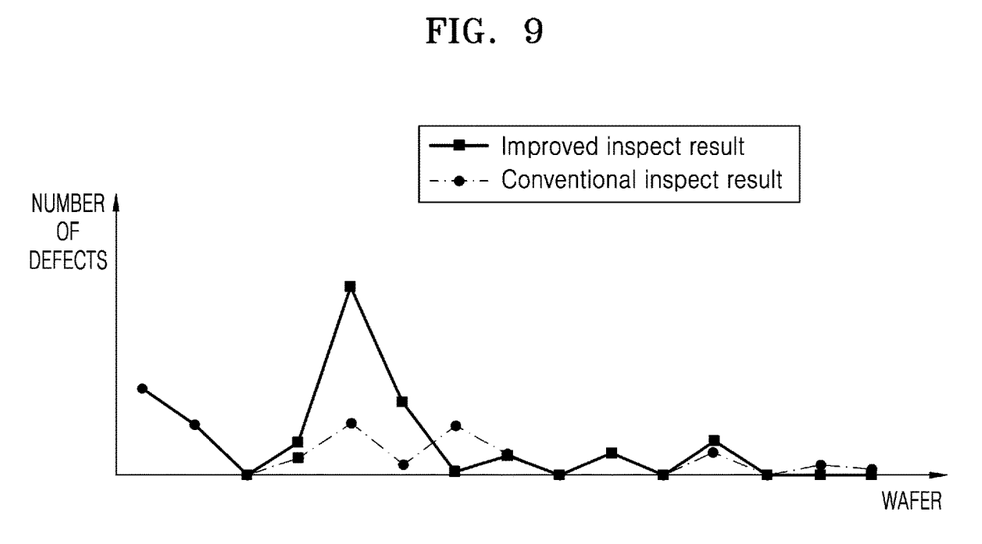
FIG. 9 is a graph schematically illustrating an experimental example by a substrate inspection method according to some embodiments.

FIGS. 8A to 8C are illustrations of photographs schematically illustrating a method of selecting an inspection target based on a weak point by a substrate inspection method. FIG. 9 is a graph schematically illustrating an experimental example by a substrate inspection method according to some embodiments.

Referring to FIGS. 8A to 8C and 9, FIG. 8A shows a defect inspection region 910 with respect to a conventional chip. FIG. 8B shows a composite map that marks a weak point WP as a result of inspecting a chip by the substrate inspection method. FIG. 8C shows improved defect inspection regions 910 and 920 with respect to the chip based on FIG. 8B. The improved defect inspection regions 910 and 920 include additional three regions 920 besides the conventional defective inspection region 910. The three additional regions 920 include weak points marked on the composite map. The inspection results with respect to the defective inspection regions are described with reference to the graph of FIG. 9.

In the graph of FIG. 9, a solid line indicates a conventional inspection result, and a dashed-dashed line indicates an improved inspection result. In addition, the conventional substrate inspection result is an inspection performed on FIG. 8A, and the improved substrate inspection result is an inspection performed on FIG. 8C. Here, the substrate inspection includes a close inspection, and was performed by using a CD-SEM device.

Referring to the graph of FIG. 9, the horizontal axis indicates different substrates, and the vertical axis represents the number of defects appearing as a result of inspection with respect to each substrate. Upon comparing the conventional substrate inspection result and the improved substrate inspection result, it was found that the improved substrate inspection result is improved by 1.5 to 3.4 times in the detected number of defects compared to the conventional substrate inspection result. That is, as a result of performing substrate inspection based on a predicted weak point, the defect detection power was improved.

While the inventive concept has been particularly shown and described with reference to embodiments thereof, it will be understood that various changes in form and details may be made therein without departing from the spirit and scope of the following claims.

What is claimed is:

1. A substrate inspection method comprising:
    radiating light onto a substrate;
    extracting a spectrum representing an intensity of light according to a wavelength from a reflected light that is reflected from the substrate;
    analyzing the extracted spectrum in units of each of an entire substrate, a shot, a chip, and a block;
    generating a spectrum distribution map indicating reflectivity for each wavelength by using the analyzed spectrum; and
    extracting a weak point in the substrate based on the spectrum distribution map, wherein the extracting the weak point comprises:
        extracting one or more outliers from the spectrum distribution map;
        generating a plurality of weak point maps in which the one or more outliers are marked with respect to one of the entire substrate, the shot, the chip, or the block;
        generating a composite map by overlapping the plurality of weak point maps; and
        extracting the weak point based, at least in part, on the composite map.

2. The substrate inspection method of claim 1, wherein the extracting of the spectrum comprises extracting the spectrum using at least one of a distance between the spectra, an average reflectivity of the spectrum for each wavelength band, or Fourier transform information.

3. The substrate inspection method of claim 1, wherein the extracting of the spectrum comprises extracting a plurality of wavelength bands in the spectrum of each of a short wavelength range, a medium wavelength range, and a long wavelength range.

4. The substrate inspection method of claim 1, wherein the extracting of the weak point in the substrate based on the spectrum distribution map comprises analyzing the spectrum with respect to a distance compared to a preset threshold value.

5. The substrate inspection method of claim 1, wherein the analyzing of the extracted spectrum in a unit of the entire substrate comprises obtaining an average value of the extracted spectrum for each of a plurality of shot units.

6. The substrate inspection method of claim 1, wherein the analyzing of the extracted spectrum in a unit of the shot comprises obtaining an average value of the extracted spectrum for each of a plurality of chip units.

7. The substrate inspection method of claim 1, wherein the analyzing of the extracted spectrum in a unit of the block comprises obtaining an average value of the extracted spectrum for each of a plurality of cell units.

8. The substrate inspection method of claim 1, wherein when a number of the one or more outliers overlapped on the composite map is equal to or more than 30 percent of a number of the overlapped weak point maps, a point where the one or more outliers overlap is extracted as the weak point.

9. The substrate inspection method of claim 1, wherein the extracting of the one or more outliers comprises extracting the one or more outliers by using a minimum covariance determinant method within the spectrum distribution map.

10. The substrate inspection method of claim 9, wherein the extracting of the one or more outliers comprises calculating a robust distance for each intensity of light within the spectrum distribution map, and selecting the robust distance as the one or more outliers when the robust distance is greater than or equal to a preset threshold value.

11. The substrate inspection method of claim 8, wherein the weak point is marked on the composite map.

12. The substrate inspection method of claim 11, wherein a color of the weak point marked on the composite map is based on a number of the one or more outliers that overlap.

13. The substrate inspection method of claim 12, wherein when a number of the one or more outliers overlapped on the composite map is equal to or more than 50 percent of a number of the overlapped weak point maps, a point where the one or more outliers overlap is extracted as a weak point.

14. The substrate inspection method of claim 1, wherein the spectrum is extracted by spectroscopic ellipsometry.

15. A substrate inspection method comprising:
radiating light onto a substrate;
extracting a spectrum representing an intensity of light according to a wavelength from a light reflected from the substrate;
generating a spectrum distribution map by using the extracted spectrum in units of any one of, or more than one of: an entire substrate, a shot, a chip, and a block;
extracting a weak point in the substrate based on the spectrum distribution map, wherein the extracting the weak point comprises generating a plurality of weak point maps in which one or more outliers are marked with respect to two or more of: the entire substrate, the shot, the chip, or the block and the extracting the weak point comprises overlapping the plurality of weak point maps to generate composite map; and
further inspecting the weak point.

16. The substrate inspection method of claim 15, wherein the further inspecting is performed by using any one of an electron beam (E-Beam) device and a critical dimension scanning electron microscope (CD-SEM).

17. The substrate inspection method of claim 15, wherein the plurality of weak point maps include a first weak point map in which one or more outliers are marked with respect to the entire substrate, a second weak point map in which one or more outliers are marked with respect to the shot, a third weak point map in which one or more outliers are marked with respect to the chip, and a fourth weak point map in which one or more outliers are marked with respect to the block; and wherein the extracting of the weak point comprises:
extracting, as a final weak point, a point where the one or more outliers overlapped in the composite map is 50 percent or more of a number of the overlapped weak point maps.

18. A substrate inspection method comprising:
obtaining a spectrum of a substrate by using an oblique optical system and a vertical optical system;
analyzing the spectrum in a unit of each of an entire substrate, a shot, a chip, and a block;
extracting a weak point in the substrate using the analyzed spectrum comprising:
generating a weak point map in which one or more outliers in the substrate are marked by using the spectrum;
generating a composite map including the weak point map overlapped with other weak point maps; and
wherein when a number of the one or more outliers overlapped on the composite map is equal to or more than 30 percent of a number of the overlapped weak point maps, a point where the one or more outliers overlap is extracted as the weak point;
performing a further, targeted inspection on the weak point of the substrate based on the extracted weak point.

19. The substrate inspection method of claim 18, wherein when the number of one or more outliers overlapped on the composite map is equal to or more than 50 percent of the number of the overlapped weak point maps, a point where the one or more outliers overlap is extracted as a weak point.

20. The substrate inspection method of claim 18, wherein the further inspection is performed on the weak point by using the weak point by using an electron beam (E-Beam) device or a critical dimension scanning electron microscope (CD-SEM).

* * * * *